United States Patent
Narayanaswami et al.

(10) Patent No.: US 7,521,819 B2
(45) Date of Patent: Apr. 21, 2009

(54) AUTOMOBILE KEY FOR KEYLESS VEHICLE OPERATION

(75) Inventors: Chandrasekhar Narayanaswami, Fairfield, CT (US); Mandayam T. Raghunath, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 11/504,324

(22) Filed: Aug. 15, 2006

(65) Prior Publication Data

US 2008/0061930 A1 Mar. 13, 2008

(51) Int. Cl.
*B60R 22/00* (2006.01)

(52) U.S. Cl. .................................................. 307/10.6

(58) Field of Classification Search ................ 307/10.3, 307/10.6

See application file for complete search history.

(56) References Cited

U.S. PATENT DOCUMENTS

| 5,869,908 | A * | 2/1999 | Moczygemba et al. ...... 307/10.5 |
| 7,034,657 | B2 * | 4/2006 | Ueda et al. .................. 340/5.62 |
| 7,222,006 | B2 * | 5/2007 | Proefke et al. ................. 701/32 |
| 2004/0178050 | A1 * | 9/2004 | Wylde ..................... 200/61.88 |

* cited by examiner

*Primary Examiner*—Robert L. Deberadinis
(74) *Attorney, Agent, or Firm*—Scully, Scott, Murphy & Presser, P.C.; Gail Zarick, Esq.

(57) ABSTRACT

A system of utilizing an automobile key, particularly for an essentially keyless operation, and wherein wireless operation of the key incorporates safety features preventing the inadvertent locking of the key in the automotive vehicle upon exiting therefrom.

16 Claims, No Drawings

AUTOMOBILE KEY FOR KEYLESS VEHICLE OPERATION

BACKGROUND OF THE INVENTION

1. Field of the Invention

The present invention relates to a system of utilizing an automobile key, particularly for an essentially keyless operation, and wherein wireless operation of the key incorporates safety features preventing the inadvertent locking of the key in the automotive vehicle upon exiting therefrom.

2. Discussion of the Prior Art

Normally, especially when utilizing automobile keys for older vehicles or new but less expensive vehicle types, these are inserted into a slot on the dashboard in order to be able to start the engine, while the key remains in the ignition into which it has been inserted in order to start the engine, and operate the vehicle. Upon accession, the driver may forget the keys (among other property) in the vehicle, and may manually lock the automobile doors by instinct and be locked out upon exiting the vehicle.

In contrast with the foregoing, keys, which are generally utilized in opening front doors of houses or offices, are much less frequently forgotten than automobile keys. This is because in the process of opening a door to a house or an office, the key holder is generally in a standing or upright position, and this is visibly conducive to drawing the key out of the door lock, and placing the key into his or her pocket, purse or pocketbook. In contrast with the foregoing, in the process of exiting an automobile, subsequent to a turning off of the ignition, the driver has to wait to get out of the automobile to be able to comfortably reach into his or her pocket, purse or pocketbook, and, as a consequence, may have a tendency to turn the ignition off and then leave the keys on the seat to pick up and remove other articles from the vehicle interior or trunk, attend to children in the vehicle, and, thus, possibly forget that the key has been left on the seat, or even in the ignition which has been deactivated. The driver may then lock the automobile by either manually actuating a lock switch on the interior of the door and then swinging the door into a closed position, or possibly the door may be of the type automatically self-locking upon the expiration of a brief period of time. Utilizing the vehicle lock switch, which is normally located on the inside of the vehicle door, is typically easier than being required to insert a key into a keyhole in order to lock the door, thereby potentially leading to a habitual practice, which has a tendency to cause the user or driver to be locked out of his or her automobile.

More recently, the automotive industry has, to some extent, solved the problem of the key being inadvertently left and forgotten in its inserted condition in the ignition system, by the development of a wireless keyless vehicle entry systems, whereby in the employment of such systems, the user does not have to insert the key into the ignition to start the vehicle. In this connection, the key is equipped with a therewith integrated wireless subsystem that can readily communicate with the vehicle and wirelessly activate a keyless automobile start mechanism upon verifying that the key is in a close range, for example, within a distance of a few feet from the vehicle. The user then has to manually press a start button of the ignition system to turn on the engine of the vehicle. During this sequence of events, the key can remain or be placed in the pocket or purse of the user, i.e., the driver of the vehicle. At the end of the journey the driver can turn off the engine by pressing the start button again or by pressing a separate button. The key is likely to be in the driver's pocket or purse since it was not inserted into the ignition at all. All authentications for effectuating the operations are implemented by wireless communication. Although such systems are clearly deemed to be convenient, the reliance on wireless technology reduces or may even imperil the security and privacy thereof if utilized with unique static identifiers, such as with passive RFID tags, as known in the art. The wireless remote-controlled functioning of such keys may enable an unauthorized person to possibly receive and copy the authorization code or information, so as to gain unlawful access to the vehicle and initiate the operation thereof. Even with this technology it is possible to for the key to be left behind in the automobile if the driver has a manual option to lock the automobile that does not require a key when getting out, such as depressing a lever on the interior of the door and swinging the door shut. Another shortcoming is that if after shutting off the engine the driver leaves the car with the key in the car and does not lock the door, say while at a gas station to pick up something quickly from the gas station store, a thief can jump in, start the automobile and get away. This event is more likely to happen with this type of automobile key since the user does not need the key to shut the engine off and therefore likely to consciously remember that the key is still in the car.

SUMMARY OF THE INVENTION

In order to ameliorate or avoid the foregoing difficulties, and eliminate the inadvertent locking of the vehicle doors while the keys remain therein, pursuant to the invention a driver may employ actuating buttons on a wireless key fob, so as to open a vehicle door or doors through the medium of wireless authorization of operative devices in the vehicle, as is currently practiced in the technology installed in various automotive vehicles. Thereafter, the user of the key fob; i.e., the driver, may insert his key into a slot which is formed in the door, preferably, although not necessarily in the interior of the door so as to be protected from the vagaries of inclement weather, or from vandalism, then turns the key, and thereafter returns or places the key into his or her pocket or purse, while still in an upstanding position, in effect, before being seated in the vehicle. Other possible positions for the key slot include the side of the seat or the center of the steering wheel. Some embodiments could provide multiple slots to offer more flexibility. The key may be of the type of wireless-entry design, as commonly known, such a rectangular member having "LOCK", "UNLOCK", "TRUNK" and "ALARM" or "PANIC" buttons provided thereon.

The insertion of the key into the slot and turning the key provides an operative connection with the vehicle ignition system. Thereafter, the driver then turns on the ignition by either pressing a start button or rotation of a button, which may be located on the dashboard or panel, similar to those installed in the newer and more luxurious automobiles. The doors of the automobile may lock automatically as soon as the car is put into gear that allows the car to move, as is the case with some automobiles today. Thereafter, when desired, the driver may turn off the ignition utilizing a stop button, or pressing the start button again, or rotating the button back, and the driver, after exiting the vehicle, may lock the doors utilizing the actuating buttons on the wireless key fob, in a manner as is currently done in the practice. The user may also lock the door by inserting the physical key into a slot in the exterior of the door. No mechanism is provided to lock the car without physical possession of the key when the driver is outside the car so as to prevent the lockout of the automobile key.

Basically, an important aspect of the present invention resides in repositioning the key slot in the vehicle door panel whereby the user can authenticate the program in the key with the vehicle and immediately put his key back into the pocket or purse. This essentially forms a wired connection of authenticating the key to the vehicle as a more secure and private process than would a wireless connection since no authenticating transmissions are made over the air. Thus, a potential intruder or unauthorized person is prevented from intruding on the wireless exchange between the vehicle and a remote control present in the key, and to then use this information to actuate the vehicle ignition, or the like, using a similar copied wireless exchange.

Another problem encountered with respect to wireless authorizations, as presently employed, is the need for installing a battery in the key-operated remote control carried by the user. In order to be able to implement the authentication that automobile manufacturers generally require to facilitate the vehicle to be started and driven, the processors normally installed on the key fob have to be more capable and also consume more electrical energy, requiring the installation of a larger battery or more frequent battery replacements. In addition, wireless transmitting, as presently employed mechanisms, is subject to possible interference from nearby metallic materials. For these reasons, more automobile manufacturers are willing to trust the installation of simple wireless means to allow the user to open the doors of a low or moderately priced vehicle, and only the more expensive and technologically advanced and more recently developed vehicles are equipped with keyless start mechanisms. Newer keyless vehicles which use simple RFID chips in their keys in order to detect that the key is in the vehicle to enable a keyless start are vulnerable to duplication by powerful readers, which may be in the possession of unauthorized persons engaged in unlawful pursuits.

DESCRIPTION OF FUNCTION OF THE INVENTION

Pursuant to the method of the present invention, inserting the correct key into a slot in the vehicle (preferably on the interior side of the vehicle door) authenticates to the vehicle ignition system that a valid driver has entered the vehicle and temporarily activates a mechanism that will allow the vehicle to start. The activation of the mechanism itself does not actually start the engine of the automobile but will enable another auxiliary means to subsequently actually start the engine of the automobile. The driver may immediately remove the key from the slot and put it into his pocket or bag while still in an upright position with comfortable access to the pant or shirt pocket or a bag. The driver then manually presses or rotates a start button (on the dashboard or panel) in order to turn on the ignition, whereby upon intending to exit the vehicle, the user turns the ignition off by pressing or rotating a stop button, and in which the start and stop button could be a single combined-operating button. The time interval for which the activation mechanism is valid, i.e., the maximum duration between inserting the key into the slot and being able to start the automobile engine by just pressing the start button is programmable through an interface in the automobile or a computer. The user would put the key in the slot in the automobile and navigate a menu on the dashboard to adjust the time period. In other cases the key may be attached to an adapter that connects to a computer that exposes program to the user to adjust this time interval and updates the key. Some drivers may choose small time windows such as 30 seconds. Others may choose larger time windows spanning several minutes. In some instances, the driver may want to drive from a first location A to a second location B, turn off the ignition and stay inside the vehicle and then start the ignition again and travel to a third location C. Hereby, it may be inconvenient to retrieve the key from the pocket or purse at location C just in order to start the vehicle again. In that event, it is simple to be able to implement the following: 1) If the driver's side door has not been opened since the vehicle entered the all-off state, i.e., shut-down of the ignition, the driver is permitted to start the vehicle by simply activating the start/stop button, which was used to turn off the vehicle; 2) If the driver's door has been opened (presumably the driver is getting out of the vehicle), the start/stop button is disabled inside the vehicle; or 3) Alternatively, for added safety, the user may have to authenticate the ignition system again by reinserting the key into the slot on the door or panel, if any door of the vehicle has been opened.

The automobile doors are automatically locked when the automobile is put into a gear that will allow motion. No means are provided to manually lock the automobile doors from outside without the key. Passengers inside the automobile may manually unlock the doors or manually lock the doors at all times from the interior of the automobile. However, as soon as a door is opened the mechanism to manually lock the door is disabled and then restored only when the door is shut. The overall purpose of this mechanism is to prevent the driver from getting out of the car and locking the automobile doors while the key is inside the automobile while providing the means to lock and unlock the automobile door to the driver and passengers while they are inside the automobile.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but to fall within the spirit and scope of the appended claims.

What is claimed is:

1. A method of actuating a vehicle ignition start system with a key, said method comprising:
   inserting said key into a slot formed on said vehicle, said key including a remote control to facilitate opening of the doors of the vehicle from a distance;
   said slot communicating with said vehicle ignition start system upon insertion of said key so as to authorize activation of said vehicle ignition start system, said slot being located selectively in a door of the vehicle, in a side of a seat, in a doorjamb or in the center of a steering wheel;
   removing said key from said slot on said vehicle; and
   actuating a keyless start button subsequent to said authorization to activate said vehicle ignition start system for starting the engine of said vehicle, and wherein upon any door of said vehicle being opened, a system for manual locking of the vehicle doors without the key from the interior of the vehicle is disabled.

2. A method as claimed in claim 1, wherein insertion of said key gains entry to said vehicle.

3. A method as claimed in claim 1, wherein the authorization of activation expires after a programmable time interval.

4. A method as claimed in claim 3, wherein said time interval is programmed using controls on the vehicle.

5. A method as claimed in claim 4, wherein said time interval is programmed on the vehicle with said key inserted in said slot.

6. A method as claimed in claim 3, wherein said time interval is programmed on a computer by attaching said key to a computer via an adapter.

7. A method as claimed in claim 1, wherein said slot is located exteriorly of said vehicle to facilitate insertion and removal of the key while a user is in a normal upstanding position.

8. A method as claimed in claim 1, wherein said slot is located interiorly of said vehicle to facilitate insertion and removal of the key while a user is in a normal upstanding position.

9. A method as claimed in claim 1, wherein upon the ignition is turned off and the driver's door has not been opened since ignition was previously turned on, the ignition is enabled to be turned on without requiring reinsertion of key into said slot.

10. A method as claimed in claim 1, wherein upon all doors of said vehicle being shut, selective locking is enabled from one or more doors in the vehicle from within the vehicle without requiring the key.

11. A system for actuating a vehicle ignition start system with a key, said system comprising:

said key being insertable into a slot formed on or within said vehicle, which communicates with said vehicle ignition start system, so as to authorize activation of said vehicle ignition start system, said slot being selectively located in the interior of a vehicle door, in a side of a vehicle seat, in a doorjamb, or in the center of a steering wheel;

said key being removed from said slot on said vehicle; and actuating a start button subsequent to said authorization to said vehicle ignition start system for starting said vehicle.

12. A system as claimed in claim 11, wherein said key is programmed to activate said vehicle ignition start system for a programmable predetermined period of time.

13. A system as claimed in claim 11, wherein said slot is located interiorly or exteriorly of said vehicle to facilitate insertion and removal of the key while a user is in an upstanding position.

14. A system as claimed in claim 11, wherein upon the ignition is turned off and the driver's door has not been opened since ignition was previously turned on, the ignition is enabled to be turned on without requiring reinsertion of key into said slot.

15. A system as claimed in claim 11, wherein upon any door of said vehicle being opened, the system for manual locking of the vehicle doors without the key from the interior of the vehicle is disabled.

16. A system as claimed in claim 11, wherein upon all doors of said vehicle being shut, selective locking is enabled from one or more doors in the vehicle from within the vehicle without requiring the key.

* * * * *